US010526883B2

(12) United States Patent
Tamboise

(10) Patent No.: US 10,526,883 B2
(45) Date of Patent: Jan. 7, 2020

(54) ABSOLUTE TIME REFERENCE BASED CONTROL SYSTEM FOR WELL CONSTRUCTION AUTOMATION

(71) Applicant: Schlumberger Technology Corporation, Sugar Land, TX (US)

(72) Inventor: Guillaume Jean Daniel Tamboise, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 318 days.

(21) Appl. No.: 15/512,588

(22) PCT Filed: Sep. 22, 2015

(86) PCT No.: PCT/US2015/051359
§ 371 (c)(1),
(2) Date: Mar. 20, 2017

(87) PCT Pub. No.: WO2016/053672
PCT Pub. Date: Apr. 7, 2016

(65) Prior Publication Data
US 2017/0254189 A1  Sep. 7, 2017

Related U.S. Application Data

(60) Provisional application No. 62/057,142, filed on Sep. 29, 2014.

(51) Int. Cl.
*E21B 44/00* (2006.01)
*G05B 19/042* (2006.01)
*E21B 19/00* (2006.01)

(52) U.S. Cl.
CPC ............ *E21B 44/00* (2013.01); *G05B 19/042* (2013.01); *E21B 19/008* (2013.01); *G05B 2219/1203* (2013.01)

(58) Field of Classification Search
CPC .......... E21B 44/00; E21B 3/02; E21B 19/008; G05B 2219/1203; G05B 19/042; G05B 19/05; G01S 19/13; G04F 5/14
See application file for complete search history.

(56) References Cited

U.S. PATENT DOCUMENTS 6,002,339 A     12/1999  Norris
6,662,110 B1    12/2003  Bargach et al.
(Continued)

FOREIGN PATENT DOCUMENTS

WO   WO2008070754 A1   6/2008

OTHER PUBLICATIONS

International Search Report and Written Opinion issued in corresponding International Application PCT/US2015/051359 dated Dec. 14, 2015. 14 pages.

(Continued)

*Primary Examiner* — Michael R Wills, III
(74) *Attorney, Agent, or Firm* — Alec J. McGinn

(57) ABSTRACT

A system for controlling drilling unit apparatus includes a plurality of drilling unit apparatus each operated by a corresponding controller. Any one or more of the controllers is in signal communication with either or both of (i) at least one sensor that generates a signal related to an operating condition of the drilling unit apparatus and (ii) at least one other of the controllers to accept as input therefrom a signal related to an operating state of the corresponding drilling unit apparatus. A plurality of time reference signal receivers is each in signal communication with a corresponding controller. An absolute time reference signal transmitter is in signal communication with each time reference signal receiver such that any one or more of the controllers operates (Continued)

its respective drilling apparatus in response to either or both of (i) the sensor signal and (ii) the signal from the at least one other controller.

18 Claims, 2 Drawing Sheets

(56) References Cited

U.S. PATENT DOCUMENTS

| | | | |
|---|---|---|---|
| 6,866,306 B2 | 3/2005 | Boyle et al. | |
| 6,904,981 B2 | 6/2005 | van Riet | |
| 8,121,971 B2* | 2/2012 | Edwards | G06N 5/025 706/50 |
| 2009/0034366 A1 | 2/2009 | Mathiszik et al. | |
| 2010/0313646 A1 | 12/2010 | Mehta et al. | |
| 2013/0154844 A1 | 6/2013 | Montgomery et al. | |
| 2014/0083688 A1* | 3/2014 | Rojas | E21B 44/00 166/250.01 |
| 2015/0112597 A1* | 4/2015 | Laing | E21B 47/042 702/9 |
| 2015/0294258 A1* | 10/2015 | Hildebrand | E21B 45/00 705/7.15 |

OTHER PUBLICATIONS

Kortenkamp, David. Artificial intelligence and mobile robots : case studies of successful robot systems. 1998. pp. 195-210. MIT Press. Cambridge, MA.

Office Action for the equivalent Mexican patent application MX/a/2017/003995 dated Jun. 4, 2019.

\* cited by examiner

ABSOLUTE TIME REFERENCE BASED CONTROL SYSTEM FOR WELL CONSTRUCTION AUTOMATION

CROSS-REFERENCE TO RELATED APPLICATIONS

The present document is based on and claims priority to U.S. Provisional Application Ser. No. 62/057,142, filed Sep. 29, 2014, which is incorporated herein by reference in its entirety.

BACKGROUND

This disclosure is related to the field of subsurface wellbore drilling unit automation. More specifically, the disclosure relates to systems for synchronizing a plurality of independently operating automatic drilling task apparatus used on a drilling unit to enable the possibility of full automation and optimization of drilling unit operations.

Drilling unit (drilling "rig") components include devices used to movably support a drill bit mounted on the end of a conduit called a "drill string." The drill string is typically formed from lengths of drill pipe or similar tubular segments connected end to end. The drill string is supported by the drilling rig structure at the Earth's surface when a wellbore is drilled on land, or when drilled below the bottom of a body of water from a water bottom supported platform or a floating structure. The drill string may be rotated by equipment on the drilling rig, e.g., a swivel/kelly/rotary table combination or a top drive, to rotate the drill bit. In some instances, a motor such as a fluid operated motor may be included in the drill string and may also be used to rotate the drill bit.

A drilling fluid made up of a base fluid, typically water or oil, and various additives, is pumped down a central opening in the drill string. The drilling fluid exits the drill string through openings called "jets" in the body of the drill bit. The drilling fluid then circulates back up an annular space formed between the wellbore wall and the drill string, carrying the cuttings from the drill bit so as to clean the wellbore. The drilling fluid may also be formulated such that the pressure exerted in the wellbore by the drilling fluid is at least as much as surrounding formation fluid pressure, thereby preventing formation fluids from entering into the wellbore.

The drilling fluid pressure typically exceeds the formation fluid pressure by some amount, which results in drilling fluid entering into the formation pores, or "invading" the formations exposed by drilling the wellbore. To reduce the amount of drilling fluid lost through such invasion, some of the additives in the drilling fluid adhere to the wellbore wall along permeable formations thus forming a relatively impermeable "mud cake" on the wellbore wall adjacent to such formations. Mud cake substantially stops continued invasion, which helps to preserve and protect the exposed formations prior to the setting of protective pipe or casing in the wellbore as part of the well construction process, as will be discussed further below. The formulation of the drilling fluid to exert hydrostatic pressure in excess of formation pressure is commonly referred to as "overbalanced drilling."

The drilling fluid ultimately returns to the surface, where it is transferred into a mud treating system, generally including components such as a shaker table to remove solids from the drilling fluid, a degasser to remove dissolved gases from the drilling fluid, a storage tank or "mud pit" and a manual or automatic means for addition of various chemicals or additives to the fluid treated by the foregoing components. The clean, treated drilling fluid flow is typically measured to determine fluid losses to exposed formations as a result of the previously described fluid invasion. The returned solids and fluid (prior to treatment) may be evaluated to determine various Earth formation characteristics used in drilling operations. Once the drilling fluid has been treated in the mud pit, it is then pumped out of the mud pit and is pumped into the drill string again.

One may conceptualize automation of processes implemented by drilling rig apparatus such as those described above using a three-layer architecture: deliberative control; reactive plan execution and feedback control. Deliberative control, the top layer, is slow and requires abstraction of control concepts. Deliberative control is where well construction planning decisions are made, e.g., and without limitation, an initial well plan including diameter of drill bits used and depths to which sections of the wellbore are to be drilled, well geodetic trajectory, casing depths, drilling fluid properties and drilling fluid flow rates. Reactive plan execution, the middle layer, translates the abstract plan generated in the deliberative control layer into machine operating instructions (whether automatically performed or manually performed by a drilling unit operator) to the feedback control layer. Reactive plan execution includes communication to the deliberative control layer of the degree to which the wellbore as actually constructed conforms to a predetermined construction plan or failure thereof, i.e., the inability of the drilling rig components to execute the predetermined construction plan.

Drilling rig operations may be referred to as "multi-tenants." A simplified view of a drilling rig system conceptualized as "multi-tenant" may include the well "operator" (e.g., an oil and gas exploration and production entity) which defines high-level goals (e.g., the predetermined well construction plan) and therefore mostly operates in the deliberative control layer. Based on a set of constraints and goals, the well operator produces the highest level of planning. A drilling contractor, i.e., the owner/operator of the drilling rig may receive well plans from the operator and execute them. The drilling contractor may monitor the operation of the drilling rig so as to execute the predetermined well construction plan, and may attempt to recover from any execution failure. Certain tasks may be outsourced to specific service companies for highly specialized control actions, e.g., and without limitation, drilling fluid composition control, acquisition of formation petrophysical measurements and selection and control of wellbore annulus pressure. Equipment manufacturers operate mostly in the feedback control layer: they design the equipment and design (or OEM) the control systems for such equipment One of the issues that requires addressing in automating control of drilling rig equipment as described above is high fragmentation of control systems and the large number of entities responsible for reactive plan execution. Separate control systems operate fluid pumping, drill string rotation and drill string hoisting systems, for example. A number of advanced control algorithms require high fidelity control of two or more of such control systems, and the same high fidelity in correlating control system operating signals with sensor measurements. Existing closed-loop control systems already provide high-fidelity actuation of specific subsystems to a high degree of precision, but do not address time synchronization, i.e., start time of a particular control sequence at a predetermined moment in time.

Multi-controller advanced control algorithms require strongly coupled behavior of disparate, independently-designed and developed control subsystems in order to effectively automate operation of the various systems on a drilling rig.

SUMMARY

A system for controlling drilling unit apparatus according to one aspect of this disclosure includes a plurality of drilling unit apparatus each operated by a corresponding controller. Any one or more of the corresponding controllers is in signal communication with either or both of (i) at least one sensor that generates a signal related to an operating condition of the corresponding drilling unit apparatus and (ii) at least one other of the corresponding controllers to accept as input therefrom a signal related to an operating state of the corresponding drilling unit apparatus operated by the at least one other controller. A plurality of time reference signal receivers is each in signal communication with a corresponding controller. An absolute time reference signal transmitter is in signal communication with each time reference signal receiver such that any one or more of the controllers operates its respective drilling apparatus in response to either or both of (i) the sensor signal and (ii) the signal from the at least one other controller.

Other aspects and advantages will be apparent from the description and claims that follow.

DETAILED DESCRIPTION

Figure 1:
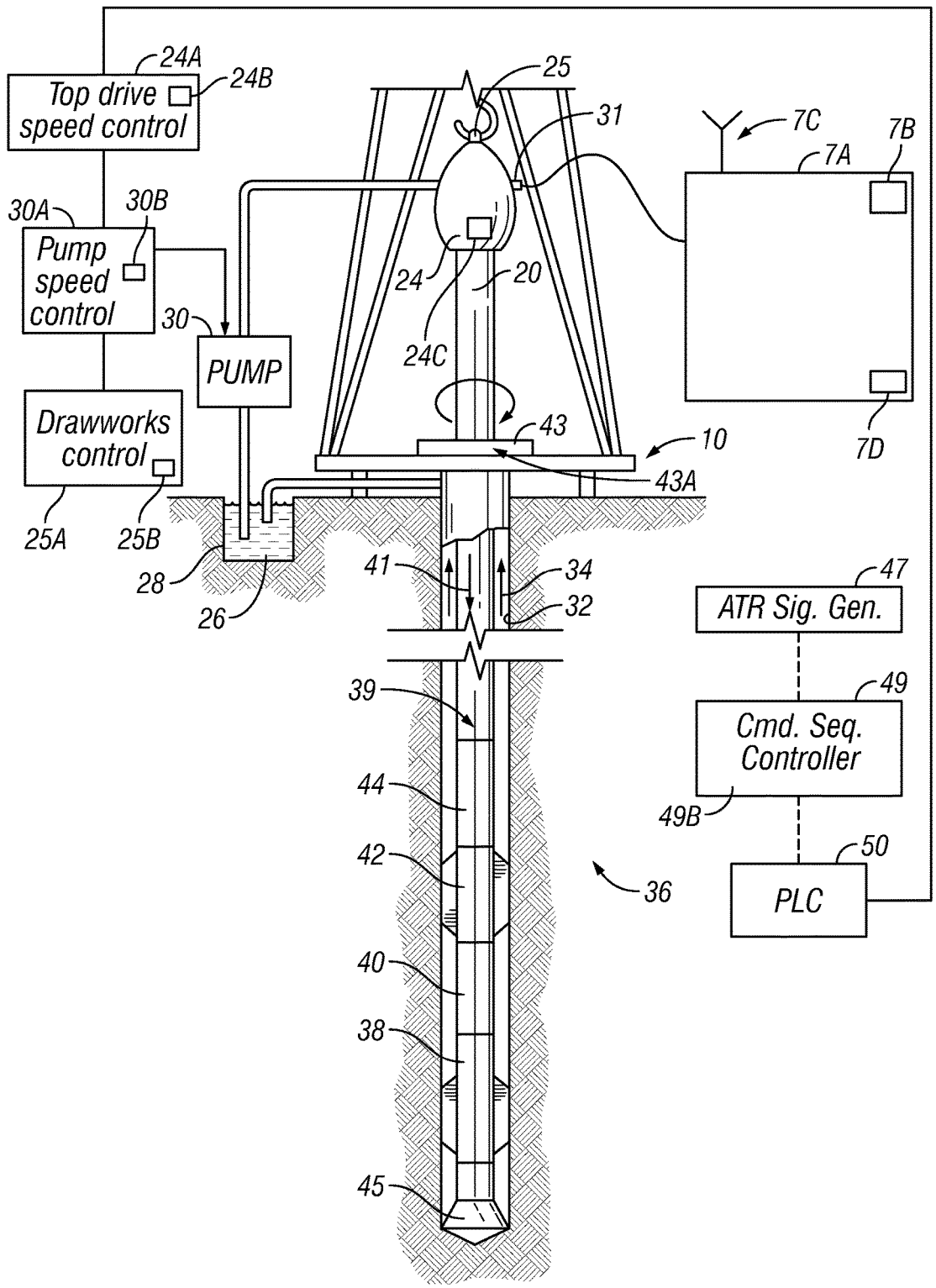
FIG. 1 shows an example drilling unit and various separate systems that may be automatically controlled.

FIG. 1 shows an example drilling system configuration. The drilling system may include a drilling unit 10 and may include instruments for acquiring wellbore data that may use, among other sensing devices, a logging while drilling (LWD) system 39. The LWD system 39 may include one or more collar sections 44, 42, 40, 38 coupled to the lower end of a drill pipe 20.

The LWD system 39 may form part of a bottom hole assembly (BHA) coupled to the drill pipe 20 and includes at a lower end thereof a drill bit 45 to drill a wellbore 32 through subsurface Earth formations 36. Drilling may be performed by rotating the drill pipe 20 using a rotary table 43, or in other example embodiments using a top drive 24. In still other embodiments a drilling motor (not shown) may be used to rotate some or all of the drill pipe 20. The manner of rotating the drill pipe 20 is not a limit on the scope of the present disclosure. During rotation, the drill pipe 20 is suspended by equipment on the drilling unit (drilling rig) 10 including the top drive 24 (if used, otherwise a swivel) which enables the drill pipe 20 to be controllably rotated while maintaining a fluid tight seal between the interior and exterior of the drill pipe 20. Drilling fluid ("mud") pumps 30 draw drilling fluid ("mud") 26 from a tank or pit 28 and pump the mud 26 through the interior of the drill pipe 20, down through the LWD system 39, as indicated by arrow 41. The mud 26 passes through orifices (not shown separately) in the drill bit 45 to lubricate and cool the drill bit 45, and to lift drill cuttings through an annulus 34 between the drill pipe 20/LWD system 39 and the wall of the wellbore 32. The drill cuttings may be collected and analyzed by separate equipment operated by a "mud logger." Any fluid content in the returned drilling mud 26, such as gas and/or oil may also be analyzed by mud logger equipment or other devices, such as an automatic gas chromatograph. The LWD system 39 may include sensors (not shown separately) that provide petrophysical measurements related to and usable in analysis of drill cuttings and the returned mud by manual or automatic entry into a computer system (see 100 in FIG. 2) that analyzes data input thereto.

The collar sections 44, 42, 40, 38 may include sensors (not shown separately) therein which make measurements of various properties of the subsurface Earth formations 36 through which the wellbore 32 is drilled. Such measurements may be recorded in a recording device (not shown separately) disposed in one or more of the collar sections 44, 42, 40, 38. LWD systems known in the art typically include one or more "measurement while drilling" (MWD) sensors (not shown separately) which measure selected drilling parameters, such as inclination and azimuthal trajectory of the wellbore 32. Other drilling sensors known in the art may include axial force (weight) applied to the LWD system 39 and to the drill bit 45, and shock and vibration sensors.

The LWD system 39 may include a mud pressure modulator (not shown separately) in one of the collar sections, e.g., collar section 44. The mud pressure modulator (not shown) applies a telemetry signal to the flow of mud 26 inside the LWD system 39 and drill pipe 20 where it is detected by a pressure sensor 31 disposed in the mud flow system. The pressure sensor 31 may be in signal communication with detection equipment (not shown) that may form part of a surface recording system 7A which enables recovery and recording of information transmitted in the telemetry signals generated by the mud pressure modulator in the LWD system 39. The telemetry signal may include a subset of measurements made by the various sensors (not shown separately) in the LWD system 39. The remainder of the measurements made by the sensors (not shown) in the LWD system 39 may be transferred, for example, using radio telemetry or a cable connection, to the surface recording system 7A when the LWD system 39 is withdrawn from the wellbore 32. The LWD system 39 may also include a high speed telemetry system using an electromagnetic communication channel to transfer measurements made by the various sensors to the surface essentially at the transmission speed of electromagnetic signals. One example embodiments of such communication channel may be provided by a so-called "wired" drill pipe system. See, for example, U.S. Pat. No. 6,866,306 issued to Boyle et al. for a non-limiting example embodiment of such a wired drill pipe system.

The data acquisition devices, systems and methods shown in FIG. 1 are only meant to serve as an example of how data are acquired at a well site, and is not in any way intended to limit the scope of the present disclosure. Other sources of data may include control systems for wellbore pressure control. See, for example, U.S. Pat. No. 6,904,981 issued to van Riet. The system described in the van Riet '981 patent can provide automatic control over wellbore fluid pressure, and may also calculate parameters such as expected formation fluid pressure and expected formation fracture pressure. Such data may also be communicated as will be further explained below. Still other sources of data may include, without limitation, so-called "mudlogging" data as explained above, wherein drilling fluid returned from the wellbore is analyzed for the presence of materials such as hydrocarbons, and samples of drill cuttings are analyzed for mineral content and grain structure. Still other data may include casing programs (i.e., depth to which casings are set and respective diameters thereof and types of cement to be used) and planned wellbore geodetic trajectory. Any one or more of the foregoing data types, whether measured during drilling of the wellbore or after the drill string 20 is removed from the wellbore, may be entered into a computer system (explained below with reference to FIG. 2) manually or otherwise, and may be referred to as a "wellbore construction parameters."

The drilling rig operator ("driller") may operate the drilling rig, such as by manual input to a control panel of a controller such as a programmable logic controller (PLC) 50. The PLC 50 may be a separate device or may be part of a computer or computer system, e.g., 100 in FIG. 2) that operates various devices on the drilling rig 10 such as the rate at which the pump 30 discharges drilling mud, the rate at which the height of the top drive 24 is changed, i.e., a rate at which the top drive 24 lowered into the wellbore or raised from the wellbore by a drawworks control system 25A. The rate of change of height when drilling (lowering the height) affects the axial force (weight) on the drill bit 45. The weight on the drill bit 45 may be inferred from measurements made by a load cell 25 that measures the axial loading on the drill pipe 20. Rotating speed of the drill bit 45 may be inferred, e.g., from a control signal used to operate the rotary table 43 or top drive 24. The foregoing parameters, which are controllable by the driller, may be referred to as "drilling operating parameters."

Another sensor that may be used in some embodiments is a torque sensor 43A that may be coupled to the rotary table 43 if used, or may be included in the top drive 24, shown as torque sensor 24C. The mud pumps 30, drawworks (not shown for clarity of the illustration) and top drive 24 rotation (or rotary table 43 rotation) may each be controlled by a corresponding controller 30A, 25A, 24A, implemented, for example as a PLC.

In FIG. 1 the surface recording system 7A may include a data communication subsystem 7B coupled to a suitable antenna, satellite dish or other communication link 7C. Such data communication subsystem 7B may be of any type known in the art suitable for use at the particular location of the well site, for example, satellite communication to the Internet, or a dedicated satellite based communication link. Radio communication, wired communication or any other form of data communication is within the scope of the communication subsystem 7B applicable to the present example method and system and the foregoing examples should not be considered limiting. Communication may take place over any form of data network.

For purposes of the present disclosure, the drilling system shown in FIG. 1 may be only one of a plurality of drilling systems that may be monitored by a well construction engineer or drilling engineer from any location and using any device that can access a computer system as will be explained with reference to FIG. 2. Such access devices may be directly connected to the computer system, or may be remotely accessible, such as by wireless broadband systems using Internet-capable communication (e.g., tablets or smart phones), dedicated-channel wireless or radio communication terminals, or public switched telephone network connected terminals (e.g., ADSL Internet access).

Figure 2:
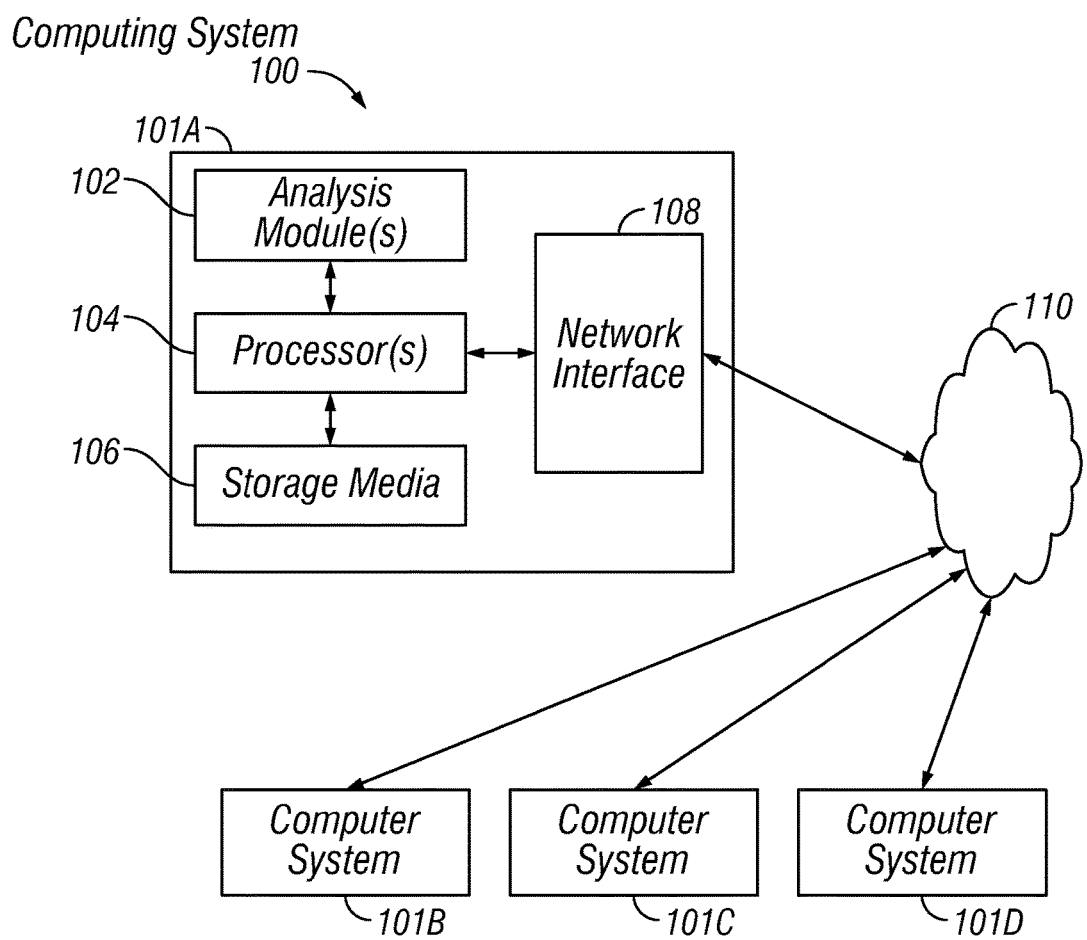
FIG. 2 shows an example computer system that may be used in some embodiments.

FIG. 2 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks to be explained further below. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be on a ship underway on the ocean or on a well drilling location, while in communication with one or more computer systems such as 101C and/or 101D that may be located in one or more data centers on shore, aboard ships, and/or located in varying countries on different continents). The processor(s) 104 may be in signal communication with a display/input device 107, which may be, for example, and without limitation, a touch screen, LCD or LED display and keyboard or any other form of device for displaying information transferred through or generated in the processor 104 to one or more human operators. Each of the additional computer systems 101B, 101C, 101D may have associated therewith a display and user input device 101BB, 101CC, 101D, respectively, as explained with reference to computer system 101A.

A processor for purposes of the present disclosure can include a microprocessor, microcontroller, processor module or subsystem, programmable integrated circuit, programmable gate array, or another control or computing device.

The storage media 106 may be implemented as one or more computer-readable or machine-readable storage media. Note that while in the exemplary embodiment of FIG. 2 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 2, and/or computing system 100 may have a different configuration or arrangement of the components depicted in FIG. 2. The various components shown in FIG. 2 may be implemented in hardware, software, or a combination of both hardware and software, including one or more signal processing and/or application specific integrated circuits.

Further, the elements in the processing methods described below may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Referring once again to FIG. 1, the PLC 50, the command sequence controller 49, if used, the drawworks controller 25A, the pump speed controller 30A, the top drive speed controller 24A and the LWD/MWD recording system 7A may be synchronized to a common time reference. The PLC 50 and/or the command sequence controller 49 if used may accept as input signals from any one or more of sensors such as those described above, including, without limitation, the torque sensor 43A, the load cell 25 and the MWD/LWD system. The PLC 50 and/or the command sequence controller 49 if used may also accept as input signals corresponding to a selected operating condition entered into any one or more of the respective drilling unit apparatus controllers 24A, 25A, 30A. Any one or more of the different drilling unit apparatus controllers, e.g., 24A, 25A, 30A may have its operation at least in part changed by either or both of the above described signals communicated to the PLC 50 and/or the command sequence controller 49. The change in operation of any of the controllers, e.g., 24A, 25A, 30A is intended to take place at specific times or within predetermined time intervals.

By synchronizing the operation of the foregoing devices to a common time reference, any of the above actions or other actions which are intended to be performed automatically, or for which manual control of one or more of the foregoing controllers, e.g., 24A, 25A, 30A, may be limited or inhibited during specific time intervals or at specific times when another one or more of the foregoing apparatus is performing certain predefined functions, suitable operation of each of the foregoing different drilling unit apparatus may be optimized.

In some embodiments, wherein certain operations on the drilling system are intended to function automatically, the command sequence controller 49 may be in signal communication using any form of signal communication, with each of the controllers, e.g., 24A, 25A, 30A and/or the PLC 50. The command sequence controller 49 may be configured to communicate a predetermined sequence of operations to be performed by each of the plurality of drilling apparatus and a starting time and stopping of each sequence of operations or part thereof.

In one example embodiment of time synchronization according to the present disclosure, each of the foregoing controllers 24A, 25A, 30A, 7A and the command sequence controller 49, if used, may include an absolute time reference signal receiver, for example, a global positioning system (GPS) satellite signal receiver or global navigation satellite system (GNSS) signal receiver, shown respectively at 24B, 25B, 30B, 7D and 49B As is known in the art, the signals communicated from such satellites include an absolute time signal. Using such receivers with each of the controllers 24A, 25A, 30A, 7A, 49 may enable additional automation of tasks performed by such controls.

In another embodiment, an absolute time reference signal generator 47 may be substituted for the absolute time reference signal receiver(s) associated with each of the respective controllers 24A, 25A, 30A, 7A, 49. The absolute time reference signal generator 47 may transmit a time signal to any or all of the controllers 24A, 25A, 30A, 7A, 49. The absolute time reference signal generator 47 may comprise one or more atomic clocks and may be programmed to be synchronized with a time signal transmitted by, for example, a GPS or GNSS satellite at selected time intervals.

In other embodiments, the controllers 24A, 25A, 30A, 7A 49 may each comprise a respective time signal receiver 24B, 25B, 30B, 7D and 49B configured to detect a time signal using, for example, Institute of Electrical and Electronics Engineers (IEEE) protocol 1588 (PTP). The time signal receiver 24B, 25B, 30B, 7D and 49B may obtain its time signal from a single GPS/GNSS receiver or from an atomic clock with a suitable transceiver connected thereto. If an atomic clock is used in any embodiment, it may be periodically synchronized to an absolute time reference such as GPS/GNSS time signals.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for controlling drilling unit apparatus, comprising:
    a plurality of drilling unit apparatus each operated by a corresponding controller, any one or more of the corresponding controllers in signal communication with at least one of
        (i) at least one sensor, the at least one sensor generating a signal related to an operating condition of the corresponding drilling unit apparatus and
        (ii) at least one other of the corresponding controllers to accept as input therefrom a signal related to an operating state of the corresponding drilling unit apparatus operated by the at least one other controller;
    a plurality of time reference signal receivers each in signal communication with a corresponding controller, wherein at least one of the time reference signal receivers comprises a time signal receiver; and
    an absolute time reference signal transmitter in signal communication with each time reference signal receiver, the absolute time reference signal transmitter comprising a time signal transmitter in signal communication with an absolute time reference signal generator, and wherein any one or more of the plurality of controllers operates the respective drilling unit apparatus in response to at least one of (i) the sensor signal and (ii) the signal from the at least one other controller.

2. The system of claim 1 wherein at least one of the time reference signal receivers comprises a global navigation satellite system signal receiver.

3. The system of claim 1 wherein the absolute time reference signal generator comprises a global navigation satellite system signal receiver and an atomic clock.

4. The system of claim 3 wherein the atomic clock is configured to automatically synchronize with an absolute time reference signal at selected time intervals.

5. The system of claim 4 further comprising a global navigation satellite system signal receiver in signal communication with the atomic clock.

6. The system of claim 1 wherein the plurality of drilling unit apparatus comprises one or more of a drawworks control, a top drive rotary speed control and a drilling fluid pump speed control.

7. The system of claim 1 wherein the plurality of drilling unit apparatus comprises a measurement while drilling system coupled to a drill string suspended in a wellbore by the drilling unit.

8. The system of claim 1 further comprising at least one command sequence controller in signal communication with each corresponding controller, the command sequence controller configured to communicate a sequence of operations to be performed by each of the plurality of drilling unit apparatus and a starting time of each sequence of operations or part thereof.

9. A method for controlling operation of a plurality of different drilling unit apparatus, comprising:
communicating a control signal to each of the plurality of different drilling unit apparatus, the control signal comprising at least an absolute time reference, the absolute time reference comprising an atomic clock signal;
at least one of (i) measuring at least one parameter related to an operating condition of at least one of the plurality of different drilling unit apparatus and (ii) communicating an operating condition of at least one of the different drilling unit apparatus to at least one other of the different drilling unit apparatus; and
operating each of the different drilling unit apparatus according to a corresponding predetermined operation sequence, wherein the operating any one or more of the different drilling unit apparatus is operated in response to the control signal and, (i) the at least one measured parameter and/or (ii) the communicated operating state.

10. The method of claim 9 wherein the absolute time reference comprises a global navigation satellite system signal.

11. The method of claim 9 further comprising synchronizing the atomic clock signal to a global navigation satellite system signal at selected time intervals.

12. The method of claim 9 wherein the operating each of the plurality of different drilling unit apparatus comprises one or more of controlling a rotation rate of a top drive, controlling a height of a top drive, controlling a rate of flow of a drilling fluid pump and controlling operation of a measurement while drilling and/or logging while drilling instrument on a drill string.

13. The method of claim 12 wherein the controlling the height of the top drive comprises controlling a lift or drop rate of a drawworks connected to the top drive.

14. The method of claim 9 wherein the operating any one or more of the plurality of different drilling unit apparatus comprises at least one of (i) automatically operating at least one of the plurality of different drilling unit apparatus and (ii) limiting manual operation of at least one of the plurality of different drilling unit apparatus.

15. A system for controlling operation of a plurality of different drilling unit apparatus, the system comprising one or more processors configured to:
communicate a control signal to each of the plurality of different drilling unit apparatus, the control signal comprising at least an absolute time reference;
at least one of:
(i) measure at least one parameter related to an operating condition of at least one of the plurality of different drilling unit apparatus and
(ii) communicate an operating condition of at least one of the different drilling unit apparatus to at least one other of the different drilling unit apparatus; and
operate each of the different drilling unit apparatus according to a corresponding predetermined operation sequence, wherein
the operating any one or more of the different drilling unit apparatus is operated in response to the control signal and, (i) the at least one measured parameter and/or (ii) the communicated operating state
and wherein the operating each of the different drilling unit apparatus comprises one or more of controlling a rotation rate of a top drive, controlling a height of a top drive by controlling a lift or drop rate of a drawworks connected to the top drive, controlling a rate of flow of a drilling fluid pump and controlling operation of a measurement while drilling and/or logging while drilling instrument on a drill string.

16. The system of claim 15 wherein the absolute time reference comprises one or more of a global navigation satellite system signal and an atomic clock signal.

17. The system of claim 15 the one or more processors further configured to synchronize the atomic clock signal to the global navigation satellite system signal at selected time intervals.

18. The system of claim 15 wherein the operating any one or more of the plurality of different drilling unit apparatus comprises at least one of (i) automatically operating at least one of the plurality of different drilling unit apparatus and (ii) limiting manual operation of at least one of the plurality of different drilling unit apparatus.

* * * * *